United States Patent
Horn et al.

(10) Patent No.: US 12,493,016 B2
(45) Date of Patent: Dec. 9, 2025

(54) MEASURING DEVICE AND METHOD FOR MEASURING PARAMETERS OF A PIEZOELECTRIC CRYSTAL ONTO WHICH A THIN FILM OF MATERIAL IS DEPOSITED AS WELL AS THIN-FILM DEPOSITION SYSTEMS WITH SUCH A DEVICE AND A METHOD FOR CONTROLLING SUCH SYSTEMS

(71) Applicant: EVATEC AG, Trübbach (CH)

(72) Inventors: Peter Horn, Mels (CH); Edmund Schüngel, Buchs (CH); Adrian Herde, Hombrechtikon (CH)

(73) Assignee: EVATEC AG, Trübbach (CH)

( * ) Notice: Subject to any disclaimer, the term of this patent is extended or adjusted under 35 U.S.C. 154(b) by 47 days.

(21) Appl. No.: 18/254,466

(22) PCT Filed: Nov. 9, 2021

(86) PCT No.: PCT/EP2021/081124
§ 371 (c)(1),
(2) Date: May 25, 2023

(87) PCT Pub. No.: WO2022/117294
PCT Pub. Date: Jun. 9, 2022

(65) Prior Publication Data
US 2024/0053301 A1    Feb. 15, 2024

(30) Foreign Application Priority Data
Dec. 1, 2020    (CH) ..................................... 1528/20

(51) Int. Cl.
*G01N 29/12*    (2006.01)
*C23C 16/455*    (2006.01)
(Continued)

(52) U.S. Cl.
CPC ....... *G01N 29/12* (2013.01); *C23C 16/45536* (2013.01); *C23C 16/45544* (2013.01);
(Continued)

(58) Field of Classification Search
CPC .... G01N 29/12; G01N 29/346; G01N 29/348; G01N 29/2443; G01N 29/42;
(Continued)

(56) References Cited

U.S. PATENT DOCUMENTS

2002/0173922 A1*  11/2002  Potyrailo ............. G01N 29/036
                                              702/39
2018/0267086 A1   9/2018  Rinzan

FOREIGN PATENT DOCUMENTS

WO       2015051250 A1    4/2015

OTHER PUBLICATIONS

International Search Report and Written Opinion for PCT/EP2021/081124 dated Mar. 4, 2022.
(Continued)

*Primary Examiner* — Jeffrey M Shin
(74) *Attorney, Agent, or Firm* — McDonald Hopkins LLC

(57) ABSTRACT

A measuring device for measuring parameters of a piezoelectric crystal onto which a thin film of material is deposited (under vacuum). The crystal includes two spaced-apart electrodes. A frequency generator is adapted to generate an oscillator signal at a specified output frequency. A measuring amplifier is adapted to apply the oscillator signal as a drive signal to one of the electrodes of the crystal and to provide a crystal output signal in response to the drive signal. A quadrature demodulator is adapted to down convert the crystal output signal and to provide an in-phase output signal and a quadrature output signal. A computation unit is adapted to determine one or more parameters of the crystal based on the in-phase output signal and the quadrature
(Continued)

output signal. Furthermore, there is provided a corresponding measuring method as well as to thin-film deposition systems (including a vacuum chamber) with such a device and methods for controlling such systems.

30 Claims, 3 Drawing Sheets

(51) Int. Cl.
    *C23C 16/50*     (2006.01)
    *G01N 29/34*     (2006.01)
    *H01J 37/32*     (2006.01)

(52) U.S. Cl.
    CPC ............ *C23C 16/50* (2013.01); *G01N 29/346* (2013.01); *G01N 29/348* (2013.01); *H01J 37/3244* (2013.01); *H01J 37/32935* (2013.01); *G01N 2291/0237* (2013.01); *H01J 2237/24578* (2013.01); *H01J 2237/332* (2013.01); *H01J 2237/3323* (2013.01)

(58) Field of Classification Search
    CPC ............ G01N 29/4463; G01N 29/4472; H01J 37/32935; H01J 37/3244
    See application file for complete search history.

(56) References Cited

OTHER PUBLICATIONS

Search Report issued in Swiss Patent Application No. CH01528/20 dated Mar. 11, 2021.
Mills, C.A., et al.: "A Multiplexed Impedance Analyzer for Characterizing Polymer-Coated QCM Sensor Arrays", IEEE Sensors Journal, Aug. 1, 2006, pp. 996-1002, vol. 6, No. 4, XP055892782.
"Improved Quartz Crystal Microbalance Instrument", IBM Technical Disclosure Bulletin, International Business Machines Corp., Jul. 1, 1988, pp. 1-03, vol. 31, No. 2, Thornwood, US, XP000105667.

* cited by examiner a)

b)

MEASURING DEVICE AND METHOD FOR MEASURING PARAMETERS OF A PIEZOELECTRIC CRYSTAL ONTO WHICH A THIN FILM OF MATERIAL IS DEPOSITED AS WELL AS THIN-FILM DEPOSITION SYSTEMS WITH SUCH A DEVICE AND A METHOD FOR CONTROLLING SUCH SYSTEMS

TECHNICAL FIELD

The present invention is related to a measuring device and to a method for measuring parameters of a piezoelectric crystal onto which a thin film of material is deposited (under vacuum) as well as to thin-film deposition systems (comprising a vacuum chamber) with such a device and methods for controlling such systems.

BACKGROUND OF THE INVENTION

So-called quartz crystal microbalances (QCMs) are commonly used to monitor the thickness of a thin film of material being deposited on a substrate under vacuum. Thereby, mass variations of a quartz crystal, onto the surface of which the thin film of material is also being deposited, are determined based on a change of the resonance frequency of the quartz crystal. The accuracy with which the film thickness can be determined is dependent on the precision with which certain parameters of the piezoelectric crystal, such as its acoustic properties, for instance represented by its motional resistance (quantifying dissipative losses), capacitance (inversely proportional to the stiffness) and inductance (proportional to the mass) of the Butterworth-Van Dyke equivalent circuit, can be derived based on the measured resonance frequency. Known measuring devices employ an analogue phase locked loop tuned to the resonance frequency. Frequently, the amplitude in decibel (dB) and the phase angle (i.e. the polar coordinates) at the resonance frequency are used to determine Cartesian coordinates (i.e. the real and imaginary parts) e.g. of an admittance of the oscillator circuit in order to determine the parameters of the piezoelectric crystal, based upon which the film thickness is then calculated.

Unfortunately, this often results in rather inaccurate values for the film thickness. Another problem is that when the film deposited on the quartz crystal becomes thicker the value of the motional resistance is increased which results in greater damping of the oscillation at the resonance frequency, i.e. the amplitude of the resonance peak decreases. At the same time, the phase response curve in the vicinity of the resonance frequency becomes flatter, thus for instance making it more difficult to track the resonance frequency under noisy conditions. This is especially pronounced for high values of parallel capacitance, e.g. due to the electrode capacitance, cabling capacitance and the input capacitance of the measuring circuit. As a result, the parallel capacitance limits the usage time of the quartz crystal, such that is must be replaced more frequently when the parallel capacitance is large. In order to replace the quartz crystal a vacuum coating system typically needs to be vented and therefore can only be carried out between processing of substrates. Even when no venting is required, replacing the quartz crystal during a running process causes problems, because the process cannot be monitored during the time when the quartz crystal is being replaced and subsequently the measured film thickness on the new quartz crystal does not match the current thickness of the film deposited on the substrate (by an offset).

Consequently, there is a need for being able to determine parameters of a piezoelectric crystal with higher precision than is currently possible with known measuring devices. Furthermore, these is also a need for increasing the usage time of quartz crystals for monitoring the thickness of a thin film of material being deposited on a substrate under vacuum.

SUMMARY OF THE INVENTION

It is an object of the present invention to provide an improved measuring device capable of measuring parameters of a piezoelectric crystal onto which a thin film of material is deposited, in particular yielding more accurate parameter values. This object is reached by the measuring device according the disclosure.

Correspondingly, it is an object of the present invention to provide an improved method for measuring parameters of a piezoelectric crystal onto which a thin film of material is deposited, in particular yielding more accurate parameter values. This object is reached by the measuring method according to the present disclosure.

It is a further goal of the present invention to increase the usage time of quartz crystals for monitoring the thickness of a thin film of material being deposited on a substrate under vacuum (and equivalently to increase the maximum allowable film thickness of the material deposited on the quartz crystal). This goal is achieved by the measuring device and method according to the present disclosure.

It is yet another object of the present invention to provide improved thin-film deposition systems, in particular capable of a more accurate deposition of a thin-film of material onto a substrate, and more particularly where the usage time of the quartz crystal is increased, i.e. requiring less frequent replacement of the quartz crystal (and equivalently to increase the maximum allowable film thickness of the material deposited on the quartz crystal). Such a vacuum coating system and such a (plasma enhanced) atomic layer deposition (ALD/PEALD) system is specified in the present disclosure.

Correspondingly, it is also another object of the present invention to provide an improved control method for controlling thin-film deposition systems allowing more accurate deposition of a thin film of material onto a substrate, and more particularly being able to increase the usage time of the quartz crystal, i.e. requiring less frequent replacement of the quartz crystal. Such methods are specified in the present disclosure for a vacuum coating system and an ALD/PEALD system, respectively.

Specific embodiments of the device, systems and methods according to the present invention are given in the dependent claims.

The present invention provides a measuring device for measuring parameters of a piezoelectric crystal onto which a thin film of material is deposited, comprising:

said piezoelectric crystal with two spaced-apart electrodes, onto which crystal (and/or electrodes) said film of material is deposited, said crystal for instance having a fundamental resonance frequency (when no film is deposited thereon) in the range from 1 MHz to 100 MHz, more particularly in the range from 2 MHz to 7 MHz, most particularly in the range from 5 MHz to 6 MHz, said crystal in particular being an AT cut quartz crystal;

a frequency generator adapted to generate an oscillator signal at a specified output frequency;

a measuring amplifier adapted to apply said oscillator signal as a drive signal to one of said electrodes of said crystal and to provide a crystal output signal in response to said drive signal;

a quadrature demodulator adapted to down convert said crystal output signal (to baseband) and to provide an in-phase output signal and a quadrature output signal, said in-phase and quadrature output signals in particular being digital signals;

a computation unit adapted to determine one or more parameters of said crystal, in particular when said film of material is deposited on said crystal (and/or said electrodes), based on said in-phase output signal and said quadrature output signal, in particular at a plurality of different frequencies, for instance at a fundamental resonance frequency of said crystal, at one or more harmonic resonance frequencies of said crystal, at one or more anharmonic resonance frequencies of said crystal, or at one more frequencies above or below said fundamental resonance frequency of said crystal.

In an embodiment of the device said parameters of said crystal are:

a crystal series resistance;
a crystal series capacitance;
a crystal series inductance;
a parallel admittance (of the crystal);
a crystal quality factor, and/or wherein said computation unit is further adapted to determine a thickness or mass of said film of material deposited on said crystal (and/or electrodes) and/or a rate of increase of said thickness or mass of said film of material deposited on said crystal (and/or electrodes) based on said in-phase output signal and said quadrature output signal.

In a further embodiment the device further comprises:
a compensation unit adapted to numerically compensate/eliminate an effect of a, respectively said parallel admittance (of the crystal), in particular a parallel capacitance, in particular by subtracting a conductance value of said parallel admittance from a signal based on said in-phase output signal and said quadrature output signal to provide a compensated in-phase output signal, and by subtracting a susceptance value of said parallel admittance from a further signal based on said in-phase output signal and said quadrature output signal to provide a compensated quadrature output signal.

In a further embodiment the device further comprises:
a frequency control unit adapted to generate a frequency control signal as an input to said frequency generator, wherein said frequency control signal is adapted such that said crystal is operated at a resonance frequency (of the crystal), said resonance frequency being dependent on said thickness or mass of said film of material deposited on said crystal, and wherein said frequency control signal is determined based on (at least) one of the following control variables:

a phase resulting from an arctangent of said compensated quadrature output signal divided by said compensated in-phase output signal, wherein said phase is in particular driven to zero in order to operate said crystal at said resonance frequency, wherein said phase is in particular computed by means of a CORDIC (coordinate rotation digital computer) processor;

a tangent resulting from a division of said compensated quadrature output signal by said compensated in-phase output signal, in particular by a magnitude of said compensated in-phase output signal, wherein said tangent is in particular driven to zero in order to operate said crystal at said resonance frequency;

an imaginary part of an impedance resulting from a division of said compensated quadrature output signal by a sum of the squared compensated in-phase output signal and the squared compensated quadrature output signal, wherein said imaginary part of said impedance is in particular driven to zero in order to operate said crystal at said resonance frequency.

In a further embodiment the device further comprises:
an amplitude control unit adapted to generate an amplitude control signal to be applied to said frequency generator for amplifying an amplitude of said oscillator signal based on said in-phase output signal and/or said quadrature output signal.

For instance, when the quartz crystal is new, i.e. when no material has been deposited thereupon, the oscillator signal amplitude is reduced, in response to e.g. the measured in-phase output signal having a high level. Conversely, when the quartz crystal has been used for a prolonged period of time, i.e. when a thick film of material has been deposited thereupon, the oscillator signal amplitude is increased, in response to e.g. the measured in-phase output signal having a low level. In this way, the signal-to-noise ratio (SNR) can be kept essentially constant independent of the thickness of the film of material deposition on the quartz crystal.

In a further embodiment of the device:
said frequency generator is a quadrature oscillator with a frequency control input to which said frequency control signal is applied, adapted to provide an in-phase signal as said oscillator signal and a 90° phase-shifted quadrature signal with the same output frequency (e.g. in the range 4-7 MHz with millihertz resolution) dependent on said frequency control signal, and wherein:
said measuring amplifier applies said in-phase signal as said drive signal to said one of said electrodes of said crystal, and wherein said quadrature demodulator comprises:
an in-phase signal mixer adapted to multiply said in-phase signal with said crystal output signal and to provide an intermediate in-phase output signal;

a quadrature signal mixer adapted to multiply said quadrature signal with said crystal output signal and to provide an intermediate quadrature output signal;

an in-phase signal filter adapted to lowpass filter (e.g. with a "cut-off"/3 dB frequency in the range from 1 kHz to 10 kHz) said intermediate in-phase output signal and to provide said in-phase output signal (representative of a real part of said crystal output signal);

a quadrature signal filter adapted to lowpass filter (e.g. with a "cut-off"/3 dB frequency in the range from 1 kHz to 10 kHz) said intermediate quadrature output signal and to provide said quadrature output signal (representative of the imaginary part of said crystal output signal).

In a further embodiment the device further comprises:
a scaling/transformation unit adapted to scale/transform said in-phase and said quadrature output signal dependent on a signal amplitude of said in-phase and/or said quadrature output signal and optionally dependent on an output impedance of said measuring amplifier such that the scaled/transformed in-phase and quadrature signals are representative of an admittance of a circuit comprising said measuring amplifier and said crystal with said electrodes.

In a further embodiment the device further comprises:
an equaliser (/distortion correction/compensation unit) adapted to equalise/compensate an effect of a frequency response of said measuring amplifier on said in-phase output signal and said quadrature output signal.

In a further embodiment of the device said equalising is based on calibration/compensation data determined based on measurements of said in-phase output signal and said quadrature output signal when said drive signal is applied to an open circuit, to a short circuit and to a reference impedance, respectively, wherein said reference impedance is in particular essentially a 50 Ohm resistance.

In a further embodiment of the device said parallel admittance is determined based on said in-phase output signal and said quadrature output signal measured at a frequency lower (e.g. by at least 1 MHz, e.g. at 4.5 MHz) than said resonance frequency of said crystal and further based on said in-phase output signal and said quadrature output signal measured at a frequency higher (e.g. by at least 500 kHz, e.g. at 6.5 MHz) than said resonance frequency of said crystal.

In further embodiments the device features one or more of the following:
  said output frequency is in the range of 4 MHz to 6 MHz;
  said output frequency is adjustable with an accuracy in the millihertz (mHz) range;
  said output frequency is generated by a direct digital synthesiser (DDS) or numerically controlled oscillator (NCO).

Furthermore, the present invention is directed to a thin-film deposition system in the form of a vacuum coating system for depositing a thin film of material onto a substrate, said system comprising the measuring device as previously specified and further comprising a process chamber, a substrate holder adapted to receive said substrate, an evaporation source and a (high) vacuum pump, wherein the crystal of said measuring device is arranged in close proximity of said substrate holder, for instance at a periphery of said substrate holder or on a perimeter of said substrate holder or adjacent to said substrate holder, and wherein a control signal applied to said evaporation source is based on said determined thickness of said film of material deposited on said crystal (and/or electrodes) and/or on said determined rate of increase of said thickness of said film of material deposited on said crystal, wherein said control signal in particular controls a power level applied to said evaporation source.

In an embodiment the system further comprises at least one of the following elements:
  a substrate heater;
  a shutter;
  a (high) vacuum valve;
  a process gas inlet;
  an auxiliary plasma source or ion source, e.g. in the form of a glow discharge electrode,
wherein said control signal or a further control signal based on said determined thickness of said film of material deposited on said crystal (and/or electrodes) and/or on said determined rate of increase of said thickness of said film of material deposited on said crystal is applied to control at least one of said elements.

Furthermore, the present invention is directed to a thin-film deposition system in the form of an atomic layer deposition system or a plasma enhanced atomic layer deposition system for depositing a thin film of material onto a substrate, said system comprising the measuring device as previously specified and further comprising a process chamber, a substrate holder adapted to receive said substrate, a precursor gas inlet with an associated precursor gas valve and an associated precursor gas pump adapted to control a flow of precursor gas introduced into the process chamber and/or a reactive gas inlet with an associated reactive gas valve and an associated reactive gas pump adapted to control a flow of reactive gas (or of a second type of precursor) introduced into the process chamber, and a plasma source for generating a plasma in the process chamber in the case of a plasma enhanced atomic layer deposition system, wherein the crystal of said measuring device is arranged in close proximity of said substrate holder, for instance at a periphery of said substrate holder or on a perimeter of said substrate holder or adjacent to said substrate holder, and wherein at least one of the following is based on said determined thickness of said film of material deposited on said crystal (and/or electrodes) and/or on said determined rate of increase of said thickness of said film of material deposited on said crystal:
  said flow of said precursor gas;
  said flow of said reactive (or of said second type of precursor) gas;
  a number of ALD cycles, wherein during each ALD cycle said precursor gas is introduced into the process chamber and subsequently said reactive (or said second type of precursor) gas is introduced into the process chamber;
  a process time, e.g. a duration of an ALD cycle;
  a temperature of said precursor gas and/or of said reactive gas;
  a temperature of said substrate;
  a flow of a plasma gas into the process chamber (in the case of a plasma enhanced atomic layer deposition system);
  an electric power applied to said plasma source, in particular a voltage applied by a high voltage DC source to sustain the plasma (in the case of a plasma enhanced atomic layer deposition system).

Moreover, the present invention is directed to a measuring method for measuring parameters of a piezoelectric crystal on which a thin film of material is deposited, comprising the steps of:
  depositing said thin film of material on a piezoelectric crystal with two spaced-apart electrodes, said crystal for instance having a fundamental resonance frequency (when no film is deposited thereon) in the range from 1 MHz to 100 MHz, more particularly in the range from 2 MHz to 7 MHz, most particularly in the range from 5 MHz to 6 MHz, said crystal in particular being an AT cut quartz crystal;
  generating oscillator signal at a specified output frequency (e.g. in the range 4 MHz to 7 MHz with millihertz resolution);
  applying said oscillator signal via a measuring amplifier to one of said electrodes of said crystal as a drive signal to provide a crystal output signal in response to said drive signal;
  quadrature demodulating said crystal output signal to provide a down converted (to baseband) digital in-phase output signal and digital quadrature output signal;
  determining one or more parameters of said crystal based on said in-phase output signal and said quadrature output signal, in particular at a plurality of different frequencies, for instance at a fundamental resonance frequency of said crystal, at one or more harmonic resonance frequencies of said crystal, at one or more anharmonic resonance frequencies of said crystal, or at one or more frequencies above or below said fundamental resonance frequency of said crystal.

In an embodiment of the method said parameters of said crystal are:
- a crystal series resistance;
- a crystal series capacitance;
- a crystal series inductance;
- a parallel admittance (of the crystal);
- a crystal quality factor, and/or further comprising determining said thickness or mass of said film of material deposited on said crystal (and/or electrodes) and/or said rate of increase of said thickness or mass of said film of material deposited on said crystal (and/or electrodes) based on said in-phase output signal and said quadrature output signal.

In a further embodiment the method further comprises the step of:
- numerically compensating/eliminating an effect of a respectively said parallel admittance (of the crystal), in particular a parallel capacitance, in particular by subtracting a conductance value of said parallel admittance from a signal based on said in-phase output signal and said quadrature output signal to provide a compensated in-phase output signal, and by subtracting a susceptance value of said parallel admittance from a further signal based on said in-phase output signal and said quadrature output signal to provide a compensated quadrature output signal.

In a further embodiment the method further comprises the step of:
- generating a frequency control signal for generating said frequency, wherein said frequency control signal is adapted such that said crystal is operated at a resonance frequency, said resonance frequency being dependent on said thickness of said film of material deposited on said crystal, and wherein said frequency control signal is determined based on (at least) one of the following control variables:
- a phase resulting from an arctangent of said compensated quadrature output signal divided by said compensated in-phase output signal, wherein said phase is in particular driven to zero in order to operate said crystal at said resonance frequency, wherein said phase is in particular computed by means of a CORDIC processor;
- a tangent resulting from a division of said compensated quadrature output signal by said compensated in-phase output signal, in particular by a magnitude of said compensated in-phase output signal, wherein said tangent is in particular driven to zero in order to operate said crystal at said resonance frequency;
- an imaginary part of an impedance resulting from a division of said compensated quadrature output signal by a sum of the squared compensated in-phase output signal and the squared compensated quadrature output signal, wherein said imaginary part of said impedance is in particular driven to zero in order to operate said crystal at said resonance frequency.

In a further embodiment the method further comprises the step of:
- generating an amplitude control signal for amplifying an amplitude of said oscillator signal based on said in-phase output signal and/or said quadrature output signal.

In a further embodiment of the method said oscillator signal is an in-phase signal and the method further comprises the step of:
- generating relative to said in-phase signal a 90° phase-shifted quadrature signal at said specified output frequency (e.g. in the range 4 MHz to 7 MHz with millihertz resolution), and wherein:
said in-phase signal is applied via said measuring amplifier as said drive signal to said one of said electrodes of said crystal, and wherein said quadrature demodulation comprises the steps of:
- multiplying said in-phase signal with said crystal output signal and to provide an intermediate in-phase output signal;
- multiplying said quadrature signal with said crystal output signal and to provide an intermediate quadrature output signal;
- lowpass filtering (e.g. with a "cut-off"/3 dB frequency in the range from 1 kHz to 10 kHz) said intermediate in-phase output signal to provide said in-phase signal (representative of a real part of said crystal output signal);
- lowpass filtering (e.g. with a "cut-off"/3 dB frequency in the range from 1 kHz to 10 kHz) said intermediate quadrature output signal to provide said quadrature output signal (representative of the imaginary part of said crystal output signal).

In a further embodiment the method further comprises the step of:
- scaling/transforming said in-phase and said quadrature output signal dependent on a signal amplitude of said in-phase and/or said quadrature output signal and optionally dependent on an output impedance of said measuring amplifier such that the scaled/transformed in-phase and quadrature signals are representative of an admittance of a circuit comprising said measuring amplifier (4) and said crystal with said electrodes.

In a further embodiment the method further comprises the step of:
- equalising/compensating an effect of a frequency response of said measuring amplifier on said in-phase output signal and said quadrature output.

In a further embodiment of the method said equalising/compensating is based on calibration/compensation data determined based on measuring said in-phase output signal and said quadrature output signal when said drive signal is applied to an open circuit, to a short circuit and to a reference impedance, respectively, wherein said reference impedance is in particular essentially a 50 Ohm resistance.

In a further embodiment the method further comprises the step of:
- determining said parallel admittance based on said in-phase output signal and said quadrature output signal measured at a frequency lower (e.g. by at least 1 MHz, e.g. at 4.5 MHz) than said resonance frequency of said crystal and further based on said in-phase output signal and said quadrature output signal measured at a frequency higher (e.g. by at least 500 kHz, e.g. at 6.5 MHz) than said resonance frequency of said crystal.

In a further embodiment the method further comprises a search procedure during which multiple resonance frequencies of said crystal, in particular a fundamental resonance frequency and a first anharmonic resonance frequency, are determined within a specified frequency range, in particular based on an analysis of said quadrature output signal and/or said in-phase output signal.

Additionally, the present invention is directed to a control method for controlling a vacuum coating system as previously specified using the measuring method as previously specified, comprising the steps of:
arranging the crystal in close proximity of the substrate holder, for instance at a periphery of said substrate holder or on a perimeter of said substrate holder or adjacent to said substrate holder;
applying a control signal to the evaporation source based on the determined thickness of the film of material deposited on said crystal and/or on said determined rate of increase of said thickness of said film of material deposited on said crystal, wherein said control signal in particular controls a power level applied to said evaporation source.

In an embodiment the method further comprises the step of applying said control signal or a further control signal based on said determined thickness of said film of material deposited on said crystal and/or on said determined rate of increase of said thickness of said film of material deposited on said crystal to control at least one of the following elements:
a substrate heater;
a shutter;
a (high) vacuum valve;
a process gas inlet;
an auxiliary plasma source or ion source, e.g. in the form of a glow discharge electrode.

Additionally, the present invention is directed to a control method for controlling an atomic layer deposition system or a plasma enhanced atomic layer deposition system as previously specified using the measuring method as previously specified, comprising the step of:
arranging the crystal in close proximity of the substrate holder, for instance at a periphery of said substrate holder or on a perimeter of said substrate holder or adjacent to said substrate holder,
and further comprising at least one of the following steps:
applying a control signal to the precursor gas valve and/or the precursor gas pump to control a flow of precursor gas introduced into the process chamber based on the determined thickness of the film of material deposited on said crystal and/or on said determined rate of increase of said thickness of said film of material deposited on said crystal;
applying a control signal to the reactive gas valve and/or the reactive gas pump to control a flow of reactive gas (or of a second type of precursor) introduced into the process chamber based on the determined thickness of the film of material deposited on said crystal and/or on said determined rate of increase of said thickness of said film of material deposited on said crystal;
controlling a number of ALD cycles, wherein during each ALD cycle said precursor gas is introduced into the process chamber and subsequently said reactive (or said second type of precursor) gas is introduced into the process chamber, based on the determined thickness of the film of material deposited on said crystal and/or on said determined rate of increase of said thickness of said film of material deposited on said crystal;
controlling a flow of a plasma gas into the process chamber based on the determined thickness of the film of material deposited on said crystal and/or on said determined rate of increase of said thickness of said film of material deposited on said crystal (in the case of a plasma enhanced atomic layer deposition system);
controlling an electric power applied to said plasma source, in particular a voltage applied by a high voltage DC source to sustain the plasma based on the determined thickness of the film of material deposited on said crystal and/or on said determined rate of increase of said thickness of said film of material deposited on said crystal (in the case of a plasma enhanced atomic layer deposition system).

Correspondingly, the present invention is directed to uses of the measuring device as previously specified for controlling a thin-film deposition system, in the form of a vacuum coating system, an atomic layer deposition system or a plasma enhanced atomic layer deposition system, as previously specified using the measuring method as previously specified, comprising the steps of either of the two previously specified control methods.

It is specifically pointed out that combinations of the embodiments described above can result in even further, more specific embodiments.

BRIEF DESCRIPTION OF THE DRAWINGS

The present invention is further explained below by means of non-limiting specific embodiments and with reference to the accompanying drawings, which show the following.

In the figures, like reference signs refer to like parts.

DETAILED DESCRIPTION OF THE INVENTION

The thickness of a thin film of material being deposited on an area of a substrate can be determined from the weight of the material being deposited onto the known area. Therefore, measuring film thickness can be based on weighing the amount of material that has been deposited on the area of the substrate. As noted before a piezoelectric crystal such as a quartz crystal can be used as a microbalance for this purpose. Thereby, the weight of the material deposited on the quartz crystal can be determined based on parameters of the quartz crystal such as the series motional resistance $R_m$, capacitance $C_m$ and inductance $L_m$ of the Butterworth-Van Dyke equivalent circuit of the quartz crystal or the quality factor Q (which is related to $R_m$, $C_m$ & $L_m$). As the weight of the material deposited on the quartz crystal changes, the parameters of the quartz crystal vary, which especially leads to a change of the quartz crystal's resonance frequency. The precision with which these parameters of the quartz crystal can be measured determines the accuracy of the resulting film thickness derived based in these parameters. The aim of the present invention is to provide a measuring device for measuring parameters of a piezoelectric crystal onto which a thin film of material is deposited with improved accuracy. A block diagram of a measuring device according to the present invention is shown in FIG. 1.

Figure 1:
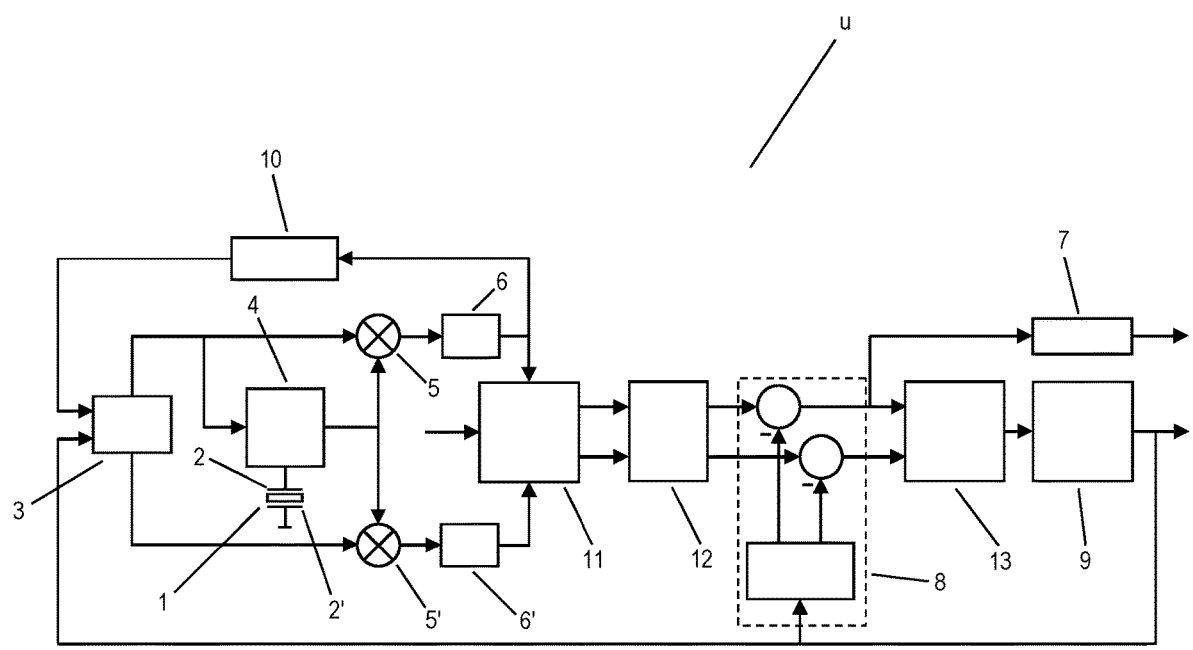
FIG. 1 a block diagram of a measuring device according to the present invention (including some optional blocks)

The central part of the measuring device U in FIG. 1 is a quartz oscillator comprising a piezoelectric quartz crystal 1 and a measuring amplifier 4. Two electrodes 2, 2' are attached to opposing sides of the quartz crystal 1, one of the electrodes 2 is connected to the measuring amplifier 4 while the other electrode 2' is connected to ground (i.e. a reference potential). An output signal of a frequency generator 3 (e.g.

a 0°-phase/in-phase signal of a quadrature oscillator) is applied via the measuring amplifier 4 as a drive signal to the electrode 2 attached to the quartz crystal 1. The frequency of the drive signal is usually set to a resonance frequency of the quartz crystal 2, which is typically in the range from 2 MHz to 7 MHz, for instance at a frequency of 6 MHz. In response to this drive signal, the quartz oscillator provides a (crystal) output signal. The desired parameters of the quartz crystal can be determined from this output signal by subsequent signal processing.

The resonance frequency (or frequencies) can be initially determined by sweeping the output frequency of the frequency generator 3 across a certain frequency scanning range (e.g. from 2 MHz to 7 MHz) and identifying the frequency (or frequencies) where a resonance peak occurs in the (crystal) output signal.

To determine the desired parameters of the quartz crystal the (crystal) output signal from the measuring amplifier 4 is down converted to baseband (i.e. 0 Hz) by means of a quadrature demodulator. The quadrature demodulator comprises an in-phase branch where the output signal from the measuring amplifier 4 is multiplied with the 0°-phase/in-phase signal of the frequency generator (quadrature oscillator) 3, i.e. the same signal used to drive the crystal oscillator, with an in-phase mixer 5 and subsequently filtered with an in-phase lowpass filter 6, typically having a "cut-off"/3 dB frequency in the range from 1 kHz to 10 kHz. The quadrature demodulator further comprises a quadrature branch where the output signal from the measuring amplifier 4 is multiplied with the 90°-phase-shifted/quadrature signal of the frequency generator (quadrature oscillator) 3 with a quadrature mixer 5' and subsequently filtered with a quadrature lowpass filter 6', typically also having a "cut-off"/3 dB frequency in the range from 1 kHz to 10 kHz. The baseband signals are digital signals which can be numerically processed. Below different alternatives are shown for achieving digital baseband signals.

The baseband I/in-phase (real part) and Q/quadrature (imaginary part) output signals are then optionally passed through a scaling (or transformation) unit adapted to scale (or transform) the in-phase and quadrature output signal in dependence of the signal amplitude of the in-phase and/or quadrature output signal and optionally in dependence of the output impedance of the measuring amplifier 4 such that the scaled (or transformed) in-phase and quadrature signals together are representative of the (complex-valued) admittance ($Y=G+jB$ with conductance $G$ and susceptance $B$ given by the in-phase (real part) and quadrature (imaginary part) signal at the output of the scaling unit) of the quartz oscillator circuit (comprising the measuring amplifier 4 and the quartz crystal 1 with the electrodes 2, 2').

The baseband I/in-phase (real part) and Q/quadrature (imaginary part) output signals, or alternatively the scaled in-phase (real part, G) and scaled quadrature (imaginary part, B) output signals of the scaling unit, are then optionally passed through an equaliser (or distortion correction or compensation) unit adapted to equalise/compensate the effect of the frequency response of the measuring amplifier on the in-phase output signal and quadrature output signal. The equalisation is based on calibration data determined based on measurements of the in-phase output signal and the quadrature output signal when the oscillator circuit is operated in an open circuit mode, in a short circuit mode and with a reference impedance, whereby the reference impedance is for instance a 50 Ohm resistance.

As stated previously, high values of parallel capacitance $C_0$ (or more generally parallel admittance $Y_0$) e.g. due to the electrode capacitance, cabling capacitance and the input capacitance of the measuring circuit, limit the usage time of the quartz crystal. The parallel capacitance $C_0$ is independent of the material being deposited on the quartz crystal, therefore, $C_0$ can be determined prior to using the quartz crystal for measuring film thickness, and the determined valve of $C_0$ can then be compensated for during use of the quartz crystal for measuring film thickness. This is achieved according to the present invention by the compensation unit 8 which is adapted to numerically compensate/eliminate the effect of the parallel admittance $Y_0$ (more specifically of the parallel capacitance $C_0$) by subtracting a conductance value $G_0$ of the parallel admittance $Y_0$ from a signal based on the in-phase output signal and the quadrature output signal to provide a compensated in-phase output signal, and by subtracting a susceptance value $B_0$ of the parallel admittance $Y_0$ from a further signal based on the in-phase output signal and the quadrature output signal to provide a compensated quadrature output signal. This compensation is also dependent on the frequency of the oscillator signal generated by the frequency generator (quadrature oscillator) 3. The parallel admittance $Y_0$ ($=G_0+jB_0$) is determined based on the in-phase output signal and the quadrature output signal measured at a frequency lower than the resonance frequency of the quartz crystal 1 and further based on the in-phase output signal and the quadrature output signal measured at a frequency higher than the resonance frequency of the quartz crystal 1. The parallel admittance $Y_0$ will typically be determined before using the measuring device u to measure parameters of a piezoelectric crystal onto which a thin film of material is deposited.

The desired parameters of the quartz crystal 1 are then determined (in particular when the film of material is being deposited on the quartz crystal 1) by the computation unit 7 based on the in-phase output signal and the quadrature output signal, in particular after (optional) compensation of parallel admittance $Y_0$, and especially also after the (optional) scaling and/or (optional) equalisation by the scaling unit 11 and the equaliser 12, respectively. The computation unit 7 can also be adapted to determine the thickness of the film of material deposited on the quartz crystal 1 and/or a rate of increase of the thickness of the film of material deposited on the quartz crystal 1 based on in-phase and quadrature output signals or based on the parameters of the quartz crystal 1.

A phase-locked loop (PLL) is used to control the frequency of the frequency generator whose output signal drives the quartz oscillator at a resonance frequency in order to determine the parameters of the quartz crystal 1 (and the thickness of the film of material deposited on the quartz crystal 1). A number of alternatives exist for generating the control signal used to adjust the frequency output signal generated by the frequency control unit 9 which is then supplied to the frequency generator (quadrature oscillator) 3—as well as to the parallel admittance/capacitance compensation unit 8. The control signal computed by the control signal computation/calculation unit 13 can be a phase signal resulting from an arctangent of the compensated quadrature output signal divided by the compensated in-phase output signal, whereby the phase is driven to zero by the frequency control unit 9 in order to operate the quartz crystal 1 at the desired resonance frequency. The phase can for instance be computed by means of a CORDIC processor. Alternatively, the control signal computed by the control signal computation/calculation unit 13 can be a tangent resulting from a division of the compensated quadrature output signal by the compensated in-phase output signal, in particular by a magnitude of the compensated in-phase output signal, whereby the tangent is driven to zero by the frequency control unit 9 in order to operate the quartz crystal 1 at the desired resonance frequency. As a further favourable alternative, the control signal computed by the control signal computation/calculation unit 13 can be an imaginary part of an impedance resulting from a division of the compensated quadrature output signal by a sum of the squared compensated in-phase output signal and the squared compensated quadrature output signal, whereby the imaginary part of the impedance is driven to zero by the frequency control unit 9 in order to operate the quartz crystal 1 at the desired resonance frequency.

Optionally, the amplitude control unit 10 generates an amplitude control signal to be applied to frequency generator 3 for amplifying the amplitude of the oscillator signal based on the in-phase output signal and/or the quadrature output signal. For instance, when the quartz crystal 1 is new, i.e. when no material has been deposited thereupon, the oscillator signal amplitude is reduced, in response to e.g. the measured in-phase output signal having a high level (because the resonance peak is large when no material is present on the quartz crystal 1). Conversely, when the quartz crystal 1 has been used for a prolonged period of time, i.e. when a thick film of material has been deposited thereupon, the oscillator signal amplitude is increased, in response to e.g. the measured in-phase output signal having a low level (because the resonance peak has become smaller due to the layer of material present on the quartz crystal 1).

A number of different technological implementations of the proposed measuring device are possible. For instance in order to be able to tune the frequency output signal of the frequency generator 3 within a range of e.g. 2 MHz to 7 MHz with a resolution within the millihertz (mHz) range the use of a direct digital synthesiser (DDS) or numerically controlled oscillator (NCO) is proposed. This is also beneficial in order to achieve an exact 90° phase difference between the in-phase and quadrature output signals of the quadrature oscillator 3. The measuring amplifier 4 is implemented as an analogue circuit. The mixers 5, 5' and the lowpass filters 6, 6' can be implemented as analogue or digital circuits. In case the mixers 5, 5' and the lowpass filters 6, 6' are implemented as analogue circuits, the down converted, baseband in-phase and quadrature signals are sampled at a low rate of for instance less than 30 kHz (e.g. 10 kHz) and digitized (analogue-to-digital converted) with a resolution of e.g. 16 bits. The other blocks 7-12 are preferably implemented digitally, in particular using programmable logic or using a programmable processor (such as a microcontroller). The mixers 5, 5' and the lowpass filters can also be implemented as digital circuits, e.g. using digital multipliers and digital (FIR) filters, but may also be implemented in software using a programmable processor (such as a microcontroller). All the digital components, e.g. the blocks 3 & 5-13, especially the high speed components (e.g. being processed with a sampling rate of >1 MHz) such as the quadrature oscillator 3, the multipliers 5, 5' and the filters 6, 6' may all be implemented in a single field-programmable gate array (FPGA). An advanced FPGA may also include a microcontroller (alongside of the programmable logic), which can execute the low speed functions (e.g. being processed with a sampling rate of <100 kHz) such as the blocks 7-13 in software/firmware. However, the microcontroller executing these functions can also be separate from the FPGA. The desired parameters of the quartz crystal 1 can be very accurately determined when quadrature demodulation of the quartz crystal output signal is performed digitally, whereby the quartz crystal output signal is for instance sampled at a high rate of >1 MHz and analogue to digital converted with a precision of e.g. 16 bits. At the output of the lowpass filters 6, 6' the sampling rate is reduced/decimated to e.g. 10 kHz. This greatly increases the signal-to-noise ratio (SNR) of the digital in-phase and quadrature baseband signals (e.g. by to 30 dB). Fully digital processing, i.e. digitization of the quartz crystal output signal instead of the baseband in-phase and quadrature signals, is therefore preferable in terms of the achievable higher SNR and therewith the increased precision with which the desired parameters of the quartz crystal 1 can be determined.

According to a further aspect of the present invention improved thin-film deposition systems are provided, in particular capable of a more accurate deposition of a thin-film of material onto a substrate, and more particularly where the usage time of the quartz crystal is increased, i.e. requiring less frequent replacement of the quartz crystal.

Figure 2:
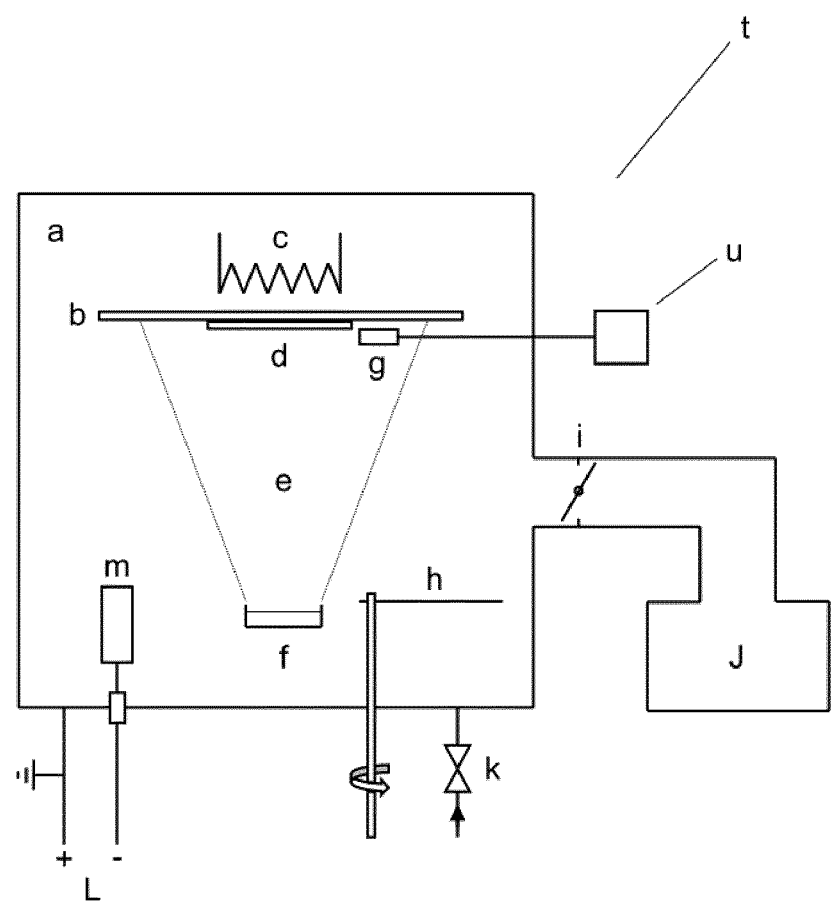
FIG. 2 a schematic diagram of a vacuum coating system according to the present invention.

A schematic diagram of such a thin-film deposition system in the form of a vacuum coating system t for depositing a thin film of material onto a substrate d is shown in FIG. 2. The system t comprises a process chamber a within which a substrate holder b adapted to receive a substrate d is arranged opposite an evaporation source f. By applying a certain level of electric (and/or thermal) power to the evaporation source f, the evaporation source f generates a vapour plume e containing material to be deposited onto the substrate d. The process chamber a is evacuated prior to deposition of the thin film of material onto the substrate d by means of a (high) vacuum pump J via a (high) vacuum valve i in order to achieve a (high) vacuum within the process chamber a. A quartz crystal g of a measuring device u as previously described is arranged in close proximity of the substrate holder b, for instance at a periphery of said substrate holder b or on a perimeter of the substrate holder b or adjacent to the substrate holder b, such that an identical or similar amount of material is deposited on a unit area of the quartz crystal g as on a unit area of the substrate d. If the quartz crystal g is less (/more) exposed to the vapour plume e containing material to be deposited onto the substrate d and therefore less (/more) material is deposited on a unit area of the quartz crystal g as on a unit area of the substrate d this is accounted for by the measuring unit u by applying an appropriate compensation factor to the determined thickness of the film of material deposited on the quartz crystal g when computing the thickness of the film of material deposited on substrate d. A control signal applied to the evaporation source f is based on the determined thickness of the film of material deposited on the crystal g and/or on a determined rate of increase of the thickness of the film of material deposited on the crystal g (or is based on determined parameters of the quartz crystal g). The control signal in particular controls a power level applied to the evaporation source g. The system t may further comprise a process gas inlet k and a shutter h. The flow of process gas through the inlet k can be controlled based on the determined thickness of the film of material deposited on the crystal g and/or on a determined rate of increase of the thickness of the film of material deposited on the crystal g (or is based on determined parameters of the quartz crystal g). Likewise, the time during which the shutter h is open/closed can also be controlled based on the determined thickness of the film of material deposited on the crystal g and/or on a determined rate of increase of the thickness of the film of material deposited on the crystal g (or is based on determined parameters of the quartz crystal g).

Figure 3:
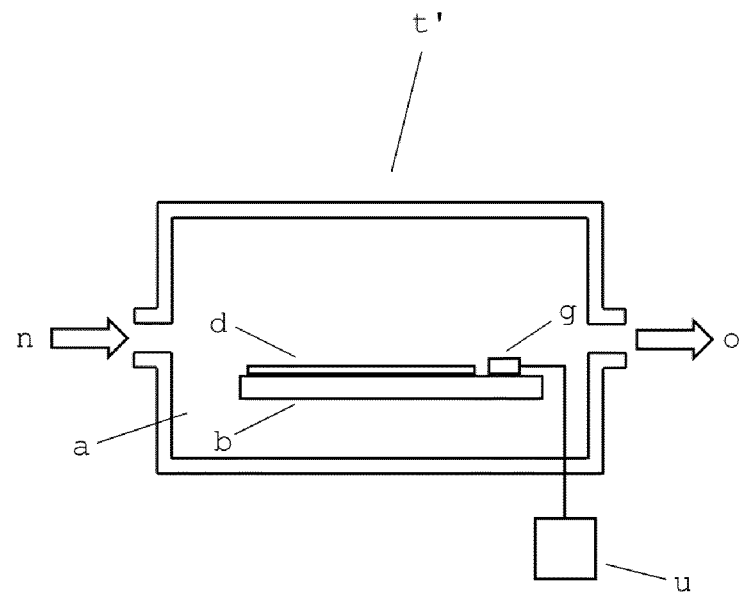
FIG. 3 a) a schematic diagram of an atomic layer deposition system according to the present invention; and
b) a schematic diagram of a plasma enhanced atomic layer deposition system according to the present invention.
Figure 3:
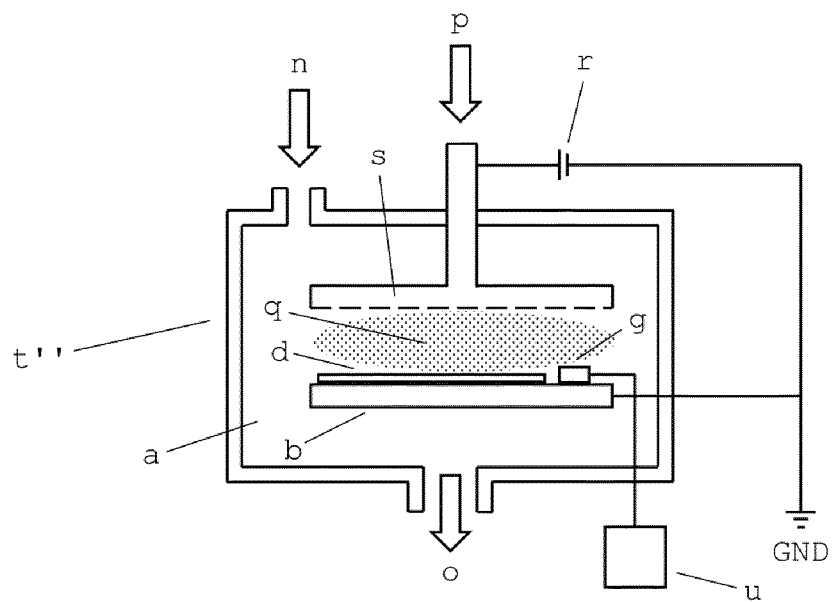

A schematic diagram of such a thin-film deposition system in the form of an atomic layer deposition (ALD) system t' for depositing a thin film of material onto a substrate d is shown in FIG. 3 a). The system t' comprises a process chamber a within which a substrate holder b adapted to receive a substrate d is arranged such that a flow of precursor gas and/or reactive gas introduced into the process chamber a and subsequently pumped out of the process chamber a flows over the substrate d. The precursor gas and/or the reactive gas is introduced into the process chamber a via one or more gas inlets n with associated gas valves and associated gas pumps adapted to control the flow of precursor gas and/or the reactive gas introduced into and subsequently pumped out of the process chamber a. The precursor gas and/or the reactive gas introduced into process chamber a chemically reacts with the substrate d such that a thin film of material is deposited on the substrate d. A quartz crystal g of a measuring device u as previously described is arranged in close proximity of the substrate holder b, for instance at a periphery of said substrate holder b or on a perimeter of the substrate holder b or adjacent to the substrate holder b, such that an identical or similar amount of material is deposited on a unit area of the quartz crystal g than on a unit area of the substrate d. If the quartz crystal g is less (/more) exposed to the precursor gas and/or the reactive gas and therefore less (/more) material is deposited on a unit area of the quartz crystal g than on a unit area of the substrate d this is accounted for by the measuring unit u by applying an appropriate compensation factor to the determined thickness of the film of material deposited on the quartz crystal g when computing the thickness of the film of material deposited on substrate d. At least one of i) the flow of a precursor gas, ii) the flow of a reactive gas, iii) the temperature of the precursor gas and/or of the substrate d, and iv) the number of ALD cycles (whereby during each ALD cycle a precursor gas is introduced into the process chamber a, and then pumped out of the process chamber a again, and subsequently a reactive gas is introduced into the process chamber a, and then pumped out of the process chamber a again) is controlled based on the determined thickness of the film of material deposited on the crystal g and/or on a determined rate of increase of the thickness of the film of material deposited on the crystal g (or is based on determined parameters of the quartz crystal g). In the ALD system t' just described the substrate d stays in the same process chamber a whilst being exposed to different precursor gases and/or reactive gases. Alternatively, the ALD system may comprise multiple (e.g. two) process chambers between which the substrate is transported and within which the substrate is exposed to a certain one of the precursor gases and/or reactive gases.

A schematic diagram of such a thin-film deposition system in the form of a plasma enhanced atomic layer deposition (PEALD) system t" for depositing a thin film of material onto a substrate d is shown in FIG. 3 b). The system t" comprises a process chamber a within which a substrate holder b adapted to receive a substrate d is arranged such that a flow of precursor gas and/or reactive gas introduced into the process chamber a and subsequently pumped out of the process chamber a flows over the substrate d. The precursor gas and/or the reactive gas is introduced into the process chamber a via one or more gas inlets n with associated gas valves and associated gas pumps adapted to control the flow of precursor gas and/or the reactive gas introduced into and subsequently pumped out of the process chamber a. Furthermore, the system t" comprises a plasma source, where a plasma gas p is introduced into the process chamber a and distributed towards the substrate d e.g. via an electrode with a showerhead s. Thereby, a plasma a formed in the vicinity of the substrate d by igniting the plasma gas p by applying electric power, e.g. by means of a high voltage DC or RF source r. A quartz crystal g of a measuring device u as previously described is arranged in close proximity of the substrate holder b, for instance at a periphery of said substrate holder b or on a perimeter of the substrate holder b or adjacent to the substrate holder b, such that an identical or similar amount of material is deposited on a unit area of the quartz crystal g than on a unit area of the substrate d. If the quartz crystal g is less (/more) exposed to the precursor gas and/or the reactive gas and therefore less (/more) material is deposited on a unit area of the quartz crystal g than on a unit area of the substrate d this is accounted for by the measuring unit by applying an appropriate compensation factor to the determined thickness of the film of material deposited on the quartz crystal g when computing the thickness of the film of material deposited on substrate d. At least one of i) the flow of a precursor gas, ii) the flow of a reactive gas, iii) the number of ALD cycles (whereby during each ALD cycle a precursor gas is introduced into the process chamber a, and then pumped out of the process chamber a again, and subsequently a reactive gas is introduced into the process chamber a, and then pumped out of the process chamber a again), iv) the flow of the plasma gas into the process chamber a, and v) the electric power applied to the plasma, e.g. the voltage applied by the high voltage DC source r to sustain the plasma, is controlled based on the determined thickness of the film of material deposited on the crystal g and/or on a determined rate of increase of the thickness of the film of material deposited on the crystal g (or is based on determined parameters of the quartz crystal g).

LIST OF REFERENCE SYMBOLS 1 piezoelectric/quartz crystal
2, 2' electrodes (of the quartz)
3 frequency generator, quadrature oscillator
4 measuring amplifier
in-phase signal mixer
5' quadrature signal mixer
6 in-phase lowpass filter
6' quadrature lowpass filter
7 computation unit (for thickness and quartz parameters)
8 parallel admittance/capacitance compensation unit
9 frequency control unit
amplitude control unit
11 scaling/conversion unit (-> admittance)
12 distortion correction unit (equaliser)
13 control signal calculation unit
a process/vacuum chamber
b substrate holder
c substrate heater
d substrate
e vapour plume
f evaporator source
g piezoelectric/quartz crystal
h shutter
i (high) vacuum valve
J (high) vacuum pump
k process gas inlet
L electric power source
m auxiliary plasma source or ion source, glow discharge electrode
n precursor gas inlet o pump
p plasma gas inlet
q plasma
r high voltage DC source
s electrode with showerhead
t vacuum coating system, thin-film deposition system
t' atomic layer deposition system
t" plasma enhanced atomic layer deposition system
u measuring device
GND ground, reference potential
B susceptance
$B_0$ parallel susceptance
$C_0$ parallel capacitance
$C_m$ crystal series capacitance
G conductance
$G_0$ parallel conductance
$L_m$ crystal series inductance
Q crystal quality factor
$R_m$ crystal series resistance
Y admittance
$Y_0$ parallel admittance

What is claimed is:

1. A measuring device for measuring one or more parameters of a piezoelectric crystal onto which a thin film of material is deposited, comprising:
    said piezoelectric crystal with two spaced-apart electrodes, onto which crystal said film of material is deposited,;
    a frequency generator adapted to generate an oscillator signal at a specified output frequency;
    a measuring amplifier adapted to apply said oscillator signal as a drive signal to one of said electrodes of said crystal and to provide a crystal output signal in response to said drive signal;
    a quadrature demodulator adapted to down convert said crystal output signal and to provide an in-phase output signal and a quadrature output signal;
    a computation unit adapted to determine one or more parameters of said crystal based on said in-phase output signal and said quadrature output signal when said film of material is deposited on said crystal, based on said in-phase output signal and said quadrature output signal; and
    a compensation unit adapted to numerically compensate an effect of a parallel admittance.

2. The device (u) of claim 1, wherein said parameters of said crystal are:
    a crystal series resistance;
    a crystal series capacitance;
    a crystal series inductance;
    said parallel admittance being a parallel capacitance;
    a crystal quality factor,
    and/or wherein said computation unit is further adapted to determine a thickness or mass of said film of material deposited on said crystal and/or a rate of increase of said thickness or mass of said film of material deposited on said crystal based on said in-phase output signal and said quadrature output signal.

3. The device (u) of claim 1,
    wherein said compensation unit is adapted to numerically compensate said effect of said parallel admittance by subtracting a conductance value of said parallel admittance from a signal based on said in-phase output signal and said quadrature output signal to provide a compensated in-phase output signal, and by subtracting a susceptance value of said parallel admittance from a further signal based on said in-phase output signal and said quadrature output signal to provide a compensated quadrature output signal.

4. The device of claim 3, further comprising:
    a frequency control unit adapted to generate a frequency control signal as an input to said frequency generator,
    wherein said frequency control signal is adapted such that said crystal is operated at a resonance frequency, said resonance frequency being dependent on a thickness or mass of said film of material deposited on said crystal, and
    wherein said frequency control signal is determined based on one of the following control variables:
    a phase resulting from an arctangent of said compensated quadrature output signal divided by said compensated in-phase output signal, wherein said phase is driven to zero in order to operate said crystal at said resonance frequency, wherein said phase is computed by means of a CORDIC processor;
    a tangent resulting from a division of said compensated quadrature output signal by said compensated in-phase output signal, by a magnitude of said compensated in-phase output signal, wherein said tangent is driven to zero in order to operate said crystal at said resonance frequency;
    an imaginary part of an impedance resulting from a division of said compensated quadrature output signal by a sum of the squared compensated in-phase output signal and the squared compensated quadrature output signal, wherein said imaginary part of said impedance is driven to zero in order to operate said crystal at said resonance frequency.

5. The device of claim 1, further comprising:
    an amplitude control unit adapted to generate an amplitude control signal to be applied to said frequency generator for amplifying an amplitude of said oscillator signal based on said in-phase output signal and/or said quadrature output signal.

6. The device of claim 1, wherein:
    said frequency generator is a quadrature oscillator with a frequency control input to which said frequency control signal is applied, adapted to provide an in-phase signal as said oscillator signal and a 90° phase-shifted quadrature signal with the same output frequency dependent on said frequency control signal,
    and wherein:
    said measuring amplifier applies said in-phase signal as said drive signal to said one of said electrodes of said crystal,
    and wherein said quadrature demodulator comprises:
    an in-phase signal mixer adapted to multiply said in-phase signal with said crystal output signal and to provide an intermediate in-phase output signal;
    a quadrature signal mixer adapted to multiply said quadrature signal with said crystal output signal and to provide an intermediate quadrature output signal;
    an in-phase signal filter adapted to lowpass filter said intermediate in-phase output signal and to provide said in-phase output signal;
    a quadrature signal filter adapted to lowpass filter said intermediate quadrature output signal and to provide said quadrature output signal.

7. The device of claim 1, further comprising:
    a scaling unit adapted to scale said in-phase and said quadrature output signal dependent on a signal amplitude of said in-phase and/or said quadrature output signal and optionally dependent on an output impedance of said measuring amplifier such that the scaled in-phase and quadrature signals are representative of an admittance of a circuit comprising said measuring amplifier and said crystal with said electrodes.

8. The device of claim 1, further comprising:
an equaliser adapted to equalise an effect of a frequency response of said measuring amplifier on said in-phase output signal and said quadrature output signal.

9. The device of claim 8, wherein said equalising is based on calibration data determined based on measurements of said in-phase output signal and said quadrature output signal when said drive signal is applied to an open circuit, to a short circuit and to a reference impedance, respectively, wherein said reference impedance is a 50 Ohm resistance.

10. The device of claim 2, wherein said parallel admittance is determined based on said in-phase output signal and said quadrature output signal measured at a frequency lower than a fundamental resonance frequency of said crystal and further based on said in-phase output signal and said quadrature output signal measured at a frequency higher than said resonance frequency of said crystal.

11. The device of claim 1, wherein said crystal has a fundamental resonance frequency when no film is deposited thereon in the range from 1 MHz to 100 MHz.

12. The device of claim 1, wherein said crystal is an AT cut quartz crystal.

13. The device of claim 1, wherein said in-phase and quadrature output signals are digital signals.

14. A thin-film deposition system in the form of a vacuum coating system for depositing a thin film of material onto a substrate, said system comprising the measuring device according to claim 1 and further comprising a process chamber, a substrate holder adapted to receive said substrate, an evaporation source and a vacuum pump, wherein the crystal of said measuring device is arranged in close proximity of said substrate holder, for instance-at a periphery of said substrate holder or on a perimeter of said substrate holder or adjacent to said substrate holder, and wherein a control signal applied to said evaporation source is based on said determined thickness of said film of material deposited on said crystal and/or on said determined rate of increase of said thickness of said film of material deposited on said crystal, wherein said control signal in particular controls a power level applied to said evaporation source.

15. The system of claim 14, further comprising at least one of the following elements:
a substrate heater;
a shutter;
a vacuum valve;
a process gas inlet;
an auxiliary plasma source or ion source, e.g. in the form of a glow discharge electrode,
wherein said control signal or a further control signal based on said determined thickness of said film of material deposited on said crystal and/or on said determined rate of increase of said thickness of said film of material deposited on said crystal is applied to control at least one of said elements.

16. A thin-film deposition system in the form of an atomic layer deposition (ALD) system or a plasma enhanced atomic layer deposition (PEALD) system for depositing a thin film of material onto a substrate, said system comprising the measuring device according to claim 1 and further comprising a process chamber, a substrate holder adapted to receive said substrate, a precursor gas inlet with an associated precursor gas valve and an associated precursor gas pump adapted to control a flow of precursor gas introduced into the process chamber and/or a reactive gas inlet with an associated reactive gas valve and an associated reactive gas pump adapted to control a flow of reactive gas introduced into the process chamber, and a plasma source in the case of a plasma enhanced atomic layer deposition system, wherein the crystal of said measuring device is arranged in close proximity of said substrate holder, for instance-at a periphery of said substrate holder or on a perimeter of said substrate holder or adjacent to said substrate holder, and wherein at least one of the following is based on said determined thickness of said film of material deposited on said crystal and/or on said determined rate of increase of said thickness of said film of material deposited on said crystal:
said flow of said precursor gas;
said flow of said reactive gas;
a number of ALD cycles, wherein during each ALD cycle said precursor gas is introduced into the process chamber and subsequently said reactive gas is introduced into the process chamber;
a process time, e.g. a duration of an ALD cycle;
a temperature of said precursor gas and/or of said reactive gas;
a temperature of said substrate.

17. A measuring method for measuring, using the measuring device of claim 1, one or more parameters of a piezoelectric crystal on which a thin film of material is deposited, comprising the steps of:
depositing said thin film of material on a piezoelectric crystal with two spaced-apart electrodes, said crystal having a fundamental resonance frequency in the range from 5 MHz to 6 MHz, said crystal being an AT cut quartz crystal;
generating oscillator signal at a specified output frequency;
applying said oscillator signal via a measuring amplifier to one of said electrodes of said crystal as a drive signal to provide a crystal output signal in response to said drive signal;
quadrature demodulating said crystal output signal to provide a down converted digital in-phase output signal and digital quadrature output signal;
determining one or more parameters of said crystal based on said in-phase output signal and said quadrature output signal, at a plurality of different frequencies, at a fundamental resonance frequency of said crystal, at one or more harmonic resonance frequencies of said crystal, at one or more anharmonic resonance frequencies of said crystal, or at one more frequencies above or below said fundamental resonance frequency of said crystal.

18. The method of claim 17, wherein said parameters of said crystal are:
a crystal series resistance;
a crystal series capacitance;
a crystal series inductance;
a parallel admittance (of the crystal);
a crystal quality factor,
and/or further comprising determining said thickness or mass of said film of material deposited on said crystal and/or said rate of increase of said thickness or mass of said film of material deposited on said crystal based on said in-phase output signal and said quadrature output signal.

19. The method of claim 17, further comprising the step of:
numerically compensating/eliminating an effect of a respectively said parallel admittance, being a parallel capacitance, by subtracting a conductance value of said parallel admittance from a signal based on said in-phase output signal and said quadrature output signal to provide a compensated in-phase output signal, and by subtracting a susceptance value of said parallel admittance from a further signal based on said in-phase output signal and said quadrature output signal to provide a compensated quadrature output signal.

20. The method of claim 19, further comprising the step of:
generating a frequency control signal for generating said frequency,
wherein said frequency control signal is adapted such that said crystal is operated at a resonance frequency, said resonance frequency being dependent on said thickness of said film of material deposited on said crystal, and
wherein said frequency control signal is determined based on one of the following control variables:
a phase resulting from an arctangent of said compensated quadrature output signal divided by said compensated in-phase output signal, wherein said phase is driven to zero in order to operate said crystal at said resonance frequency, wherein said phase is computed by means of a CORDIC processor;
a tangent resulting from a division of said compensated quadrature output signal by said compensated in-phase output signal, by a magnitude of said compensated in-phase output signal, wherein said tangent is driven to zero in order to operate said crystal at said resonance frequency;
an imaginary part of an impedance resulting from a division of said compensated quadrature output signal by a sum of the squared compensated in-phase output signal and the squared compensated quadrature output signal, wherein said imaginary part of said impedance is driven to zero in order to operate said crystal at said resonance frequency.

21. The method of claim 17, further comprising the step of:
generating an amplitude control signal for amplifying an amplitude of said oscillator signal based on said in-phase output signal and/or said quadrature output signal.

22. The method of claim 17, wherein said oscillator signal is an in-phase signal and the method further comprises the step of:
generating relative to said in-phase signal a 90° phase-shifted quadrature signal at said specified output frequency,
and wherein:
said in-phase signal is applied via said measuring amplifier as said drive signal to said one of said electrodes of said crystal,
and wherein said quadrature demodulation comprises the steps of:
multiplying said in-phase signal with said crystal output signal and to provide an intermediate in-phase output signal;
multiplying said quadrature signal with said crystal output signal and to provide an intermediate quadrature output signal;
lowpass filtering said intermediate in-phase output signal to provide said in-phase signal;
lowpass filtering said intermediate quadrature output signal to provide said quadrature output signal.

23. The method of claim 17, further comprising the step of:
scaling said in-phase and said quadrature output signal dependent on a signal amplitude of said in-phase and/or said quadrature output signal and optionally dependent on an output impedance of said measuring amplifier such that the scaled in-phase and quadrature signals are representative of an admittance of a circuit comprising said measuring amplifier and said crystal with said electrodes.

24. The method of claim 17, further comprising the step of:
equalising an effect of a frequency response of said measuring amplifier on said in-phase output signal and said quadrature output.

25. The method of claim 24, wherein said equalising is based on calibration data determined based on measuring said in-phase output signal and said quadrature output signal when said drive signal is applied to an open circuit, to a short circuit and to a reference impedance, respectively, wherein said reference impedance is a 50 Ohm resistance.

26. The method of claim 18, further comprising the step of:
determining said parallel admittance based on said in-phase output signal and said quadrature output signal measured at a frequency lower than said resonance frequency of said crystal and further based on said in-phase output signal and said quadrature output signal measured at a frequency higher than said resonance frequency of said crystal.

27. A method of using the system of claim 16, further comprising a search procedure during which a fundamental resonance frequency and a first anharmonic resonance frequency, are determined within a specified frequency range, based on an analysis of said quadrature output signal and/or said in-phase output signal.

28. A control method for controlling a vacuum coating system for depositing a thin film of material onto a substrate, said system comprising the measuring device for measuring parameters of a piezoelectric crystal onto which a thin film of material is deposited, comprising:
said piezoelectric crystal with two spaced-apart electrodes, onto which crystal said film of material is deposited, said crystal having a fundamental resonance frequency (when no film is deposited thereon) in the range from 5 MHz to 6 MHz, said crystal being an AT cut quartz crystal;
a frequency generator adapted to generate an oscillator signal at a specified output frequency;
a measuring amplifier adapted to apply said oscillator signal as a drive signal to one of said electrodes of said crystal and to provide a crystal output signal in response to said drive signal;
a quadrature demodulator adapted to down convert said crystal output signal and to provide an in-phase output signal and a quadrature output signal, said in-phase and quadrature output signals being digital signals;
a computation unit adapted to determine one or more parameters of said crystal, when said film of material is deposited on said crystal, based on said in-phase output signal and said quadrature output signal, at a plurality of different frequencies, at a fundamental resonance frequency of said crystal, at one or more harmonic resonance frequencies of said crystal, at one or more anharmonic resonance frequencies of said crystal, or at one more frequencies above or below said fundamental resonance frequency of said crystal,
and further comprising a process chamber, a substrate holder adapted to receive said substrate, an evaporation source and a vacuum pump, wherein the crystal of said measuring device is arranged in close proximity of said substrate holder, at a periphery of said substrate holder or on a perimeter of said substrate holder or adjacent to said substrate holder, and wherein a control signal applied to said evaporation source is based on said determined thickness of said film of material deposited on said crystal and/or on said determined rate of increase of said thickness of said film of material deposited on said crystal, wherein said control signal controls a power level applied to said evaporation source, using the measuring method according to claim 14, comprising the steps of:

arranging the crystal in close proximity of the substrate holder, at a periphery of said substrate holder or on a perimeter of said substrate holder or adjacent to said substrate holder;

applying a control signal to the evaporation source based on the determined thickness of the film of material deposited on said crystal and/or on said determined rate of increase of said thickness of said film of material deposited on said crystal, wherein said control signal controls a power level applied to said evaporation source.

29. The method of claim 28, further comprising the step of applying said control signal or a further control signal based on said determined thickness of said film of material deposited on said crystal and/or on said determined rate of increase of said thickness of said film of material deposited on said crystal to control at least one of the following elements:
a substrate heater;
a shutter;
a vacuum valve;
a process gas inlet;
an auxiliary plasma source or ion source, e.g. in the form of a glow discharge electrode.

30. A control method for controlling an atomic layer deposition system or a plasma enhanced atomic layer deposition system for depositing a thin film of material onto a substrate, said system comprising a measuring device for measuring parameters of a piezoelectric crystal onto which a thin film of material is deposited, comprising:
said piezoelectric crystal with two spaced-apart electrodes, onto which crystal said film of material is deposited, said crystal having a fundamental resonance frequency (when no film is deposited thereon) in the range from 5 MHz to 6 MHz, said crystal being an AT cut quartz crystal;
a frequency generator adapted to generate an oscillator signal at a specified output frequency;
a measuring amplifier-adapted to apply said oscillator signal as a drive signal to one of said electrodes of said crystal and to provide a crystal output signal in response to said drive signal;
a quadrature demodulator adapted to down convert said crystal output signal and to provide an in-phase output signal and a quadrature output signal, said in-phase and quadrature output signals being digital signals;
a computation unit adapted to determine one or more parameters of said crystal, when said film of material is deposited on said crystal-G), based on said in-phase output signal and said quadrature output signal, at a plurality of different frequencies, at a fundamental resonance frequency of said crystal, at one or more harmonic resonance frequencies of said crystal, at one or more anharmonic resonance frequencies of said crystal, or at one more frequencies above or below said fundamental resonance frequency of said crystal,
and further comprising a process chamber, a substrate holder adapted to receive said substrate, a precursor gas inlet with an associated precursor gas valve and an associated precursor gas pump adapted to control a flow of precursor gas introduced into the process chamber and/or a reactive gas inlet with an associated reactive gas valve and an associated reactive gas pump adapted to control a flow of reactive gas introduced into the process chamber, and a plasma source in the case of a plasma enhanced atomic layer deposition system, wherein the crystal of said measuring device is arranged in close proximity of said substrate holder, at a periphery of said substrate holder or on a perimeter of said substrate holder or adjacent to said substrate holder, and wherein at least one of the following is based on said determined thickness of said film of material deposited on said crystal and/or on said determined rate of increase of said thickness of said film of material deposited on said crystal:
said flow of said precursor gas;
said flow of said reactive gas;
a number of ALD cycles, wherein during each ALD cycle said precursor gas is introduced into the process chamber and subsequently said reactive gas is introduced into the process chamber;
a process time, e.g. a duration of an ALD cycle;
a temperature of said precursor gas and/or of said reactive gas;
a temperature of said substrate,
using the measuring method according to--one of claims 1d to 2d--claim 14, comprising the step of:
arranging the crystal in close proximity of the substrate holder, at a periphery of said substrate holder-or on a perimeter of said substrate holder or adjacent to said substrate holder,
and further comprising at least one of the following steps:
applying a control signal to the precursor gas valve and/or the precursor gas pump to control a flow of precursor gas introduced into the process chamber based on the determined thickness of the film of material deposited on said crystal and/or on said determined rate of increase of said thickness of said film of material deposited on said crystal;
applying a control signal to the reactive gas valve and/or the reactive gas pump to control a flow of reactive gas introduced into the process chamber based on the determined thickness of the film of material deposited on said crystal and/or on said determined rate of increase of said thickness of said film of material deposited on said crystal;
controlling a number of ALD cycles, wherein during each ALD cycle said precursor gas is introduced into the process chamber and subsequently said reactive gas is introduced into the process chamber, based on the determined thickness of the film of material deposited on said crystal and/or on said determined rate of increase of said thickness of said film of material deposited on said crystals.

* * * * *